US012809977B2

(12) United States Patent
Yaron et al.

(10) Patent No.: US 12,809,977 B2
(45) Date of Patent: Nov. 24, 2026

(54) TECHNIQUES FOR FIXING CONFIGURATION AND FOR FIXING CODE USING CONTEXTUALLY ENRICHED ALERTS

(71) Applicant: Wiz, Inc, New York, NY (US)

(72) Inventors: Eshel Yaron, Amsterdam (NL); Tomer Schwartz, Tel Aviv (IL); Barak Bercovitz, Even-Yehuda (IL); Omer Deutscher, Tel Aviv (IL); Oren Yona, Tel Aviv (IL); Eyal Golombek, Tel Aviv (IL); Pavel Resnianski, Tel Aviv (IL); Guy Biran, Tel Aviv (IL); Yuval Ofir, Pardesiya (IL)

(73) Assignee: Wiz, Inc, New York, NY (US)

(*) Notice: Subject to any disclaimer, the term of this patent is extended or adjusted under 35 U.S.C. 154(b) by 0 days.

(21) Appl. No.: 19/195,156

(22) Filed: Apr. 30, 2025

(65) Prior Publication Data

US 2025/0258913 A1 Aug. 14, 2025

Related U.S. Application Data

(63) Continuation of application No. 18/163,029, filed on Feb. 1, 2023, which is a continuation-in-part of
(Continued)

(51) Int. Cl.

*G06F 21/56* (2013.01)
*G06F 21/55* (2013.01)
*G06F 21/57* (2013.01)

(52) U.S. Cl.

CPC .......... *G06F 21/563* (2013.01); *G06F 21/552* (2013.01); *G06F 21/577* (2013.01); *G06F 2221/033* (2013.01)

(58) Field of Classification Search

USPC .......... 726/1
See application file for complete search history.

(56) References Cited

U.S. PATENT DOCUMENTS 8,271,653 B2 9/2012 DeHaan
8,806,425 B1 8/2014 Willis et al.
(Continued)

FOREIGN PATENT DOCUMENTS

EP 3208996 A1 8/2017
EP 3494506 A1 6/2019
(Continued)

OTHER PUBLICATIONS

Alrabaee, "A Survey of Binary Code Fingerprinting Approaches: Taxonomy, Methodologies, and Features", 2022, ACM (Year: 2022).
(Continued)

*Primary Examiner* — Kevin S Mai
(74) *Attorney, Agent, or Firm* — M&B IP Analysts, LLC

(57) ABSTRACT

Systems and methods for alert fixing. A method includes creating an entity graph based on correlations among software components of a software development infrastructure. The entity graph includes representing the software components. A software development pipeline is mapped in the entity graph by enumerating pipeline execution steps with respect to the software components of the software development infrastructure. Correlations between software components indicated in alerts are determined based on the entity graph. The alerts are deduplicated by matching between alerts between the alerts based on the correlations. One or more fix actions are generated based on the deduplicated alerts. The software development infrastructure is secured by causing implementation of the fix actions.

18 Claims, 9 Drawing Sheets

Related U.S. Application Data application No. 17/816,161, filed on Jul. 29, 2022, now Pat. No. 12,314,387, and a continuation-in-part of application No. 17/815,289, filed on Jul. 27, 2022, said application No. 17/816,161 is a continuation-in-part of application No. 17/656,914, filed on Mar. 29, 2022, now Pat. No. 12,204,651, said application No. 18/163,029 is a continuation-in-part of application No. 17/507,180, filed on Oct. 21, 2021.

(56) References Cited

U.S. PATENT DOCUMENTS

| | | | |
|---|---|---|---|
| 9,052,961 | B2 | 6/2015 | Mangtani et al. |
| 9,195,674 | B1 | 11/2015 | Dukes et al. |
| 9,449,042 | B1 | 9/2016 | Evans et al. |
| 9,450,783 | B2 | 9/2016 | DeHaan |
| 9,516,064 | B2 | 12/2016 | Lietz et al. |
| 9,692,778 | B1 | 6/2017 | Mohanty |
| 9,734,349 | B1 | 8/2017 | Prafullchandra et al. |
| 10,108,803 | B2 | 10/2018 | Chari et al. |
| 10,313,382 | B2 | 6/2019 | Noel et al. |
| 10,346,229 | B2 | 7/2019 | Tee et al. |
| 10,382,353 | B1 | 8/2019 | Krishnan et al. |
| 10,454,935 | B2 | 10/2019 | Parimi et al. |
| 11,429,353 | B1 | 8/2022 | Liguori et al. |
| 11,647,105 | B1 | 5/2023 | Ganesan et al. |
| 11,893,106 | B2 | 2/2024 | Kim et al. |
| 12,475,489 | B1 | 11/2025 | Bannihatti Kumar et al. |
| 2003/0131284 | A1 | 7/2003 | Flanagan et al. |
| 2009/0222479 | A1 | 9/2009 | Burukhin et al. |
| 2010/0070448 | A1 | 3/2010 | Omoigui |
| 2013/0167241 | A1 | 6/2013 | Siman |
| 2015/0341214 | A1 | 11/2015 | Croy et al. |
| 2015/0347759 | A1 | 12/2015 | Cabrera et al. |
| 2015/0363197 | A1 | 12/2015 | Carback et al. |
| 2016/0379480 | A1 | 12/2016 | OlmstedThompson et al. |
| 2017/0075749 | A1 | 3/2017 | Ambichl et al. |
| 2017/0185785 | A1 | 6/2017 | Vorona et al. |
| 2017/0249128 | A1 | 8/2017 | Fojtik et al. |
| 2017/0286692 | A1 | 10/2017 | Nakajima et al. |
| 2018/0025160 | A1 | 1/2018 | Hwang et al. |
| 2018/0129479 | A1 | 5/2018 | McPherson et al. |
| 2018/0285199 | A1 | 10/2018 | Mitkar et al. |
| 2018/0321918 | A1 | 11/2018 | Mcclory et al. |
| 2018/0373507 | A1 | 12/2018 | Mizrahi et al. |
| 2019/0007290 | A1 | 1/2019 | He et al. |
| 2019/0068622 | A1 | 2/2019 | Lin et al. |
| 2019/0294477 | A1 | 9/2019 | Koppes et al. |
| 2019/0303579 | A1 | 10/2019 | Reddy et al. |
| 2019/0318312 | A1 | 10/2019 | Foskett et al. |
| 2019/0354389 | A1 | 11/2019 | Du et al. |
| 2020/0097662 | A1 | 3/2020 | Hufsmith et al. |
| 2020/0183766 | A1 | 6/2020 | Kumar-Mayernik et al. |
| 2020/0296117 | A1 | 9/2020 | Karpovsky et al. |
| 2020/0342511 | A1 | 10/2020 | Bursey |
| 2021/0042096 | A1 | 2/2021 | White, III et al. |
| 2021/0149650 | A1 | 5/2021 | Hadi Salim |
| 2021/0168165 | A1 | 6/2021 | Alsaeed et al. |
| 2021/0182387 | A1* | 6/2021 | Zhu .......................... G06N 7/01 |
| 2021/0311855 | A1 | 10/2021 | Khan et al. |
| 2021/0382997 | A1 | 12/2021 | Yi et al. |
| 2022/0043702 | A1 | 2/2022 | Haines |
| 2022/0114023 | A1 | 4/2022 | Choksi et al. |
| 2022/0129539 | A1 | 4/2022 | Walsh et al. |
| 2022/0311794 | A1* | 9/2022 | Maya .................. G06F 11/0766 |
| 2022/0327220 | A1 | 10/2022 | Sharma et al. |
| 2022/0353341 | A1 | 11/2022 | Östrand et al. |
| 2023/0036739 | A1 | 2/2023 | Deppisch et al. |
| 2023/0118065 | A1 | 4/2023 | Kumar |
| 2023/0229781 | A1 | 7/2023 | Stolbikov et al. |
| 2023/0297366 | A1 | 9/2023 | Wigglesworth et al. |
| 2023/0333845 | A1 | 10/2023 | Zand et al. |
| 2025/0013442 | A1 | 1/2025 | Hempstead et al. |

FOREIGN PATENT DOCUMENTS

| | | | |
|---|---|---|---|
| WO | 2020091591 | A1 | 5/2020 |
| WO | 2023067423 | A1 | 4/2023 |

OTHER PUBLICATIONS

Liu, “VFDETECT: A Vulnerable Code Clone Detection System Based on Vulnerability Fingerprint”, 2017, IEEE (Year: 2017).

Doan TP, Jung S. Davs: Dockerfile Analysis for Container Image Vulnerability Scanning. CMC-Computers Materials & Continua. Jan. 1, 2022;72(1):1699-711. Jan. 1, 2022 (Jan. 1, 2022).

International Search Report for PCT Application No. PCT/IB2022/059483. The International Bureau of WIPO.

International Search Report for PCT application PCT/IB2023/052413 dated Jun. 12, 2023. The International Bureau of WIPO.

International Search Report for PCT/IB2023/057511, dated Nov. 2, 2023. Searching Authority Israel Patent Office, Jerusalem, Israel.

International Search Report, PCT/IB2023/052415; Israel Patent Office, Jerusalem. Dated Jun. 14, 2023.

Microsoft. “What is Infrastructure as Code?” Article. Jun. 29, 2021. https://docs.microsoft.com/en-us/devops/deliver/what-is-infrastructure-as-code.

Written Opinion of the International Searching Authority for PCT Application No. PCT/IB2022/059483 dated Jan. 8, 2023. The International Bureau of WIPO.

Written Opinion of the International Searching Authority, PCT/IB2023/052415. Israel Patent Office, Jerusalem. Dated Jun. 14, 2023.

Written Opinion of the Searching Authority for PCT application PCT/IB2023/052413 dated Jun. 12, 2023. The International Bureau of WIPO.

Written Opinion of the Searching Authority for PCT/IB2023/057511, dated Nov. 2, 2023. Searching Authority Israel Patent Office, Jerusalem, Israel.

International Search Report for PCT/IB2025/051650, dated May 26, 2025. Searching Authority, Israel Patent Office, Jerusalem, Israel.

Written Opinion of the Searching Authority for PCT/IB2025/051650, dated May 26, 2025. Searching Authority, Israel Patent Office, Jerusalem, Israel.

* cited by examiner

TECHNIQUES FOR FIXING CONFIGURATION AND FOR FIXING CODE USING CONTEXTUALLY ENRICHED ALERTS

CROSS-REFERENCE TO RELATED APPLICATIONS

This application is a continuation of U.S. patent application Ser. No. 18/163,029 filed on Feb. 1, 2023. The Ser. No. 18/163,029 application is a continuation-in-part of:

1) U.S. patent application Ser. No. 17/507,180 filed on Oct. 21, 2021;
2) U.S. patent application Ser. No. 17/815,289 filed on Jul. 27, 2022, now allowed; and
3) U.S. patent application Ser. No. 17/816,161 filed on Jul. 29, 2022, now allowed. The Ser. No. 17/816,161 application is a continuation-in-part of U.S. patent application Ser. No. 17/656,914 filed on Mar. 29, 2022, now U.S. Pat. No. 12,204,651.

The contents of the above-referenced applications are hereby incorporated by reference.

TECHNICAL FIELD

The present disclosure relates generally to cybersecurity for computing environments, and more specifically to various techniques for securing computing environments using enriched alerts.

BACKGROUND

Infrastructure as code (IaC) is a management technique of computing infrastructure in a high-level descriptive model. IaC allows for automating the provisioning of information technology (IT) infrastructure without requiring developers or infrastructure engineers to manually provision and manage servers, operating systems, database connections, storages, and other infrastructure elements when developing, testing, and deploying software applications. The goal of IaC is generally to provision cloud resources from code.

In IaC, an infrastructure may include various computing infrastructure resources such as network adapters, applications, containers, and the like, each of which can be implemented as code. An IaC file is interpreted or executed in order to provision these computing infrastructure resources within a cloud environment.

A key aspect of managing infrastructure is securing the infrastructure against potential cyber threats. To this end, most virtualized execution environments deploy several cybersecurity detection tools to monitor for abnormalities in different parts of the software development pipeline such as code, container repositories, production containers, and the like. These tools may generate alerts when abnormal or otherwise potentially vulnerable code or configuration is detected. In many implementations, the different tools scan for alerts in different parts of the pipeline. An alert is a collection of events that, taken together, are significant from a cybersecurity perspective. Each alert may be realized as or may include text indicating the type of potential risk, the events involved, relevant times, and the like.

Securing the infrastructure against potential cyber threats therefore requires identifying improper configurations of infrastructure resources and/or improperly written code for those resources. Once such issues with configuration and/or code are identified, appropriate steps may be taken to address the issues. To adequately address these issues, relevant components within the infrastructure must be identified so that remedial actions can be directed to those relevant components. However, existing solutions typically rely on subjective judgments by human observers who are familiar with the design of the infrastructure or premade documentation made by architects of the infrastructure. Each of these kinds of existing solution relies on subjective decisions made by human observers, which can lead to inconsistencies and result in failing to properly identify the relevant entities for purposes of addressing issues in the infrastructure. Further, these solutions rely on subjective judgments about how to address issues based on perceived relationships between infrastructure components.

In various IaC techniques, a set of interrelated modules containing resource definitions that collectively represent a desired state of a computing environment are maintained. Each module may include a set of source files. As a specific example, Terraform, a common IaC language and framework, uses Terraform applications which are initiated by execution of the "terraform apply" command with respect to a certain Terraform module. This is also referred to as applying that module. Terraform applications often take place as part of an organization's code-to-cloud pipeline, typically in an automatic and periodic manner. When a Terraform application creates or otherwise manages a cloud resource, it records an association between a language-specific identifier (e.g., a Terraform identifier) of the resource and a globally unique identifier (GUID) of the resource in a configuration mapping file such as a state file.

Each Terraform module defines a set of Terraform resources. Terraform modules may depend on each other in order to incorporate Terraform resource definitions from other Terraform modules. For some IaC languages like Terraform, a unique identifier such as a GUID is not maintained for each cloud resource (e.g., each Terraform resource) which may be utilized by modules applied using the respective IaC techniques and code.

A first Terraform module M may depend from a second Terraform module N, and the second Terraform module N may in turn depend on a third Terraform module T. In such a case, it can be said that T is a transitive dependency of M. In other words, it can be said that M indirectly depends on T (i.e., through its dependency on N which in turn depends on T). When Terraform module M is applied, the Terraform code is tasked with synchronizing the state of all resources defined by module M along with all of the resources defined by the modules N and T on which module M depends. This synchronization may include creating, deleting, and modifying resources.

A root module is a module which is applied directly, i.e., not only as a dependency of another module. Organizations often maintain several root modules as well as many non-root modules, where each non-root module only acts as a dependency for other modules and is not deployed directly.

In other IaC implementations, information identifying cloud-based resources may be stored differently. For example, in Azure Resource Manager (ARM) implementations, a cloud-based resource identifier may be stored directly in a source file rather than using a configuration mapping file to maintain associations between GUIDs and cloud-based resource identifiers as might be performed for Terraform.

Techniques that improve automated alerting and remediation are highly desirable for protecting computing infrastructure against cyber threats.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for automating alert remediation. The method comprises: extracting a plurality of entity-identifying values from cybersecurity event data included in a plurality of alerts generated for a software infrastructure; generating at least one query based on the plurality of entity-identifying values; querying an entity graph using the at least one query, wherein the entity graph has a plurality of nodes representing respective entities of the plurality of entities, wherein the plurality of entities includes a plurality of software components of the software infrastructure and a plurality of event logic components of cybersecurity event logic deployed with respect to the software infrastructure; identifying at least one path in the entity graph based on the results of the at least one query, wherein each identified path is between one of the plurality of software components and one of the plurality of event logic components; identifying at least one root cause entity based on the identified at least one path; and generating a fix action plan for the plurality of alerts based on the identified at least one root cause entity.

Certain embodiments disclosed herein also include a non-transitory computer readable medium having stored thereon causing a processing circuitry to execute a process, the process comprising: extracting a plurality of entity-identifying values from cybersecurity event data included in a plurality of alerts generated for a software infrastructure; generating at least one query based on the plurality of entity-identifying values; querying an entity graph using the at least one query, wherein the entity graph has a plurality of nodes representing respective entities of the plurality of entities, wherein the plurality of entities includes a plurality of software components of the software infrastructure and a plurality of event logic components of cybersecurity event logic deployed with respect to the software infrastructure; identifying at least one path in the entity graph based on the results of the at least one query, wherein each identified path is between one of the plurality of software components and one of the plurality of event logic components; identifying at least one root cause entity based on the identified at least one path; and generating a fix action plan for the plurality of alerts based on the identified at least one root cause entity.

Certain embodiments disclosed herein also include a system for automating alert remediation. The system comprises: a processing circuitry; and a memory, the memory containing instructions that, when executed by the processing circuitry, configure the system to: extract a plurality of entity-identifying values from cybersecurity event data included in a plurality of alerts generated for a software infrastructure; generate at least one query based on the plurality of entity-identifying values; query an entity graph using the at least one query, wherein the entity graph has a plurality of nodes representing respective entities of the plurality of entities, wherein the plurality of entities includes a plurality of software components of the software infrastructure and a plurality of event logic components of cybersecurity event logic deployed with respect to the software infrastructure; identify at least one path in the entity graph based on the results of the at least one query, wherein each identified path is between one of the plurality of software components and one of the plurality of event logic components; identify at least one root cause entity based on the identified at least one path; and generate a fix action plan for the plurality of alerts based on the identified at least one root cause entity.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
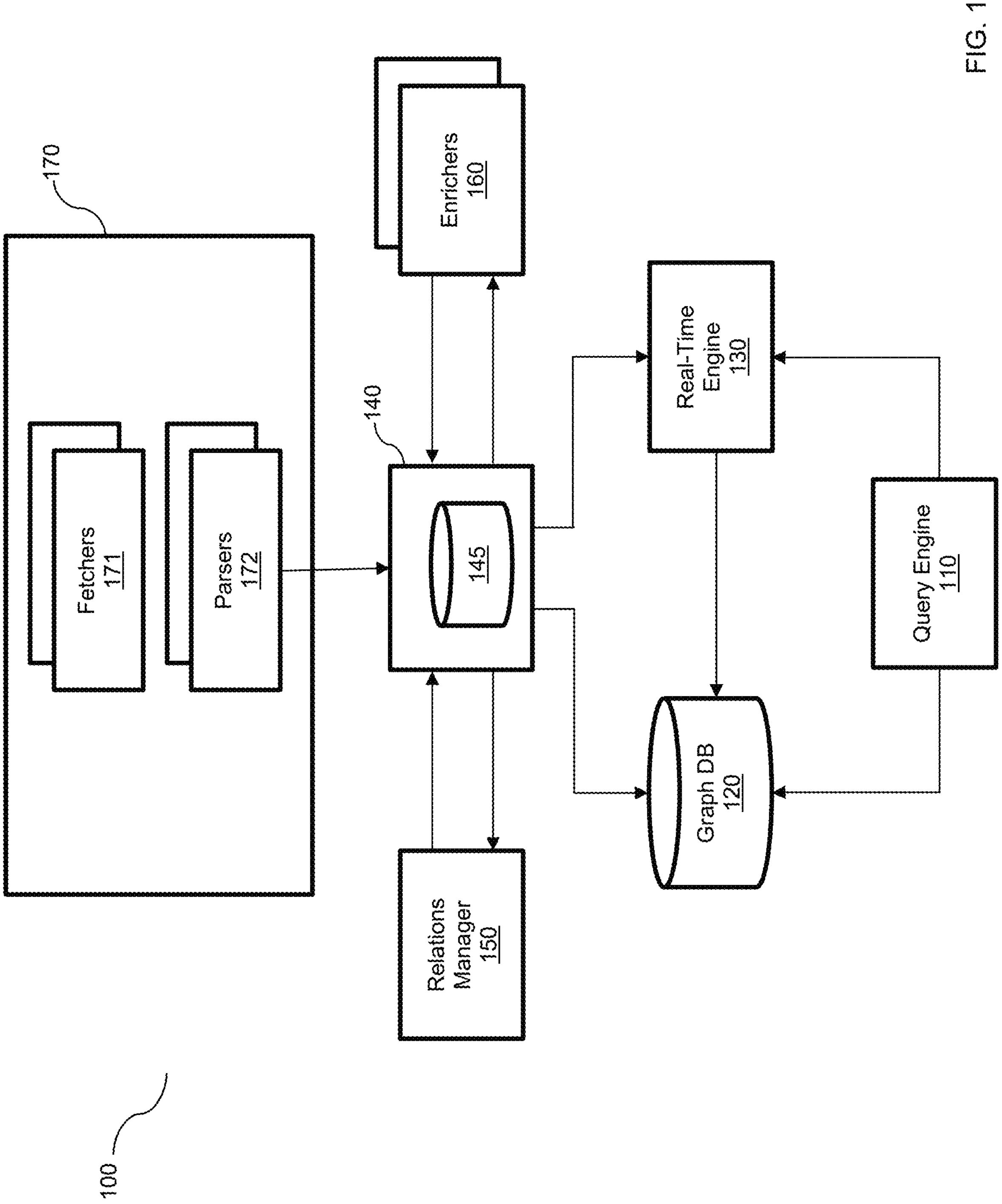
FIG. 1 is a schematic diagram of logical components of a pipeline manager utilized to describe various disclosed embodiments.

FIG. 1 shows an example schematic diagram of logical components of a pipeline manager 100 utilized to describe various disclosed embodiments. In FIG. 1, the logical components include a query engine 110, an entity graph database (DB) 120, a real-time engine 130, a state manager 140, a relations manager 150, one or more enrichers 160, and a resource finder 170.

The query engine 110 is configured to generate or otherwise receive queries (not shown) for execution with respect to an entity graph stored in the graph DB 120. Specifically, such queries may be performed, for example, in order to map steps of pipeline execution (e.g., as described below with respect to FIG. 6), to identify correlations between components indicated in alerts (e.g., as described below with respect to FIG. 7), to identify paths in the entity graph (e.g., as described below with respect to FIG. 8), and the like. The query engine 110 is further configured to query the graph DB 120, either directly or via the real-time engine 130, in order to retrieve information related to mappings of entities within the graph DB 120.

The graph DB 120 at least includes an entity graph (not separately depicted). The entity graph maps entities among a computing infrastructure and may be created, for example, as discussed below with respect to FIG. 4. The entity graph maps the software infrastructure including connections among software components acting as entities of the entity graph. To this end, the entity graph includes nodes and edges. The nodes represent distinct logical entities such as, but not limited to, software components, event logic components, and the like. The edges connect entities based on correlations between their respective entities (e.g., correlations derived as discussed below with respect to S410).

The entity graph may further include entity-identifying values representing specific entities such as, but not limited to, resource name, unique identifier, and the like. The entity graph may also include nodes representing code owners, such person to which the notification should be sent may be a person, team, business unit, and the like, represented by a node linked to the root cause entity in the entity graph.

The entity graph provides an end-to-end view of all domains of the software infrastructure including connections between components of those domains, thereby establishing potential connections between any two given components in the software infrastructure and their respective domains. In accordance with various disclosed embodiments, the entity graph includes schematic data linking different domains and demonstrating linkages within each domain. The domains include domains representing various layers of the software infrastructure as well as domains representing event logic components (e.g., policies, code defining business logic, queries, etc.) related to cybersecurity events. The event logic components represented in the entity graph may include, but are not limited to, metadata, definitions, policies or other components linked to a cybersecurity event (e.g., code defining detection logic used to detect cybersecurity events, queries which resulted in alerts triggering, etc.).

By graphing domains including both portions of the software infrastructure and event logic components related to cybersecurity events which may be triggered with respect to the software infrastructure, the entity graph can be queried in order to determine paths of nodes connecting entities to event logic components, thereby establishing the root cause of any given cybersecurity event as the entity connected to the event logic components related to the cybersecurity event.

The real-time engine 130 may be utilized to split processing of queries depending on need. For example, when query information is needed in real-time (e.g., to remediate an ongoing alert or alerts), the query may be provided to the real-time engine 130 from the query engine 110 and executed upon the graph DB 120 in real-time. When real-time processing is not required, queries may be batched or otherwise held and then processed later. Bifurcating queries in this manner allows for optimizing query processing speed for the real-time queries.

The entities and mapping in the graph DB 120 may be managed by a state manager 140. The state manager 140 may monitor for changes or inconsistencies in the entity graph in order to determine when and how to modify the entity graph to ensure that the entity graph accurately reflects the underlying software infrastructure. To this end, the state manager 140 may include a state database 145 which stores the entities and relationships discovered during analysis of the software infrastructure. The state manager 140 acts as a source of truth for the entity-related data and may intake identifications of resources which may be entities within the entity graph. The state database 145 may further store other information related to processing data related to entities such as, but not limited to, a semantic concepts dictionary used for semantically analyzing properties in original definitions of resources.

To aid in managing the state of entities represented within the entity graph, the state manager 140 may communicate with the relations manager 150, one or more enrichers 160, or both. The relations manager 150 may be configured to monitor for broken links within the entity graph, i.e., relationships (e.g., represented by edges) which include connections to entities (e.g., represented by nodes) which are no longer reflected in the entity graph. The relations manager 150 may further identify missing integrations, and may optionally send notifications to an admin of the software infrastructure in order to restore missing integrations. Thus, the relations manager 150 allows for maintaining relationships between resources represented in the entity graph as well as for removing inactive relationships from the entity graph in order to ensure that the entity graph continues to accurately reflect the connections between entities.

The enrichers 160 may be configured to enrich data related to resources and, in particular, to enrich batches of data related to multiple resources. To this end, the enrichers 160 may be configured to generate insights related to communications between resources or otherwise related to potential relationships between resources.

The state manager 140 may further be configured to communicate with a resource finder 170. The resource finder 170 is configured to process data related to potential entities of a software infrastructure in order to identify such resources and to obtain data which may be stored or otherwise used by the state manager 140. To this end, the resource finder 170 may include one or more fetchers 171 and one or more parsers 172. The resource finder 170 may further include additional components (not shown) to handle processing of data such as, but not limited to, a fetch queue manager, a fetch scheduler, a fetch normalizer, a web hook receiver, combinations thereof, and the like.

The fetchers 171 are configured to perform one or more functions for fetching data from data sources within a software infrastructure. Such functions may include, but are not limited to, accessing relevant application programming interfaces (APIs), retrieving and storing raw data, passing data to the parsers 172, and utilizing software development kits (SDKs) in order to access data in the sources. In some implementations, each source has a respective fetcher 171.

The parsers 172 are perform one or more functions for parsing data fetched from the data sources within the software infrastructure. Such functions may include, but are not limited to, handling fetched data, accessing raw data in buckets, extracting resources and relations between resources, and publishing new fetch missions. The outputs of the parsers 172 may include, but are not limited to, identifications of resources and connections between resources to be utilized by the state manager 140.

It should be noted that various logical components are depicted in FIG. 1 merely for example purposes and without limitation on the disclosed embodiments. Additional components which are not depicted may be incorporated into the pipeline manager 100 without departing from the scope of the disclosure. Further the fetchers 171 and the parsers 172 may be integrated, for example, a single component configured to perform both fetching and parsing, without departing from the scope of the disclosed embodiments.

Figure 2:
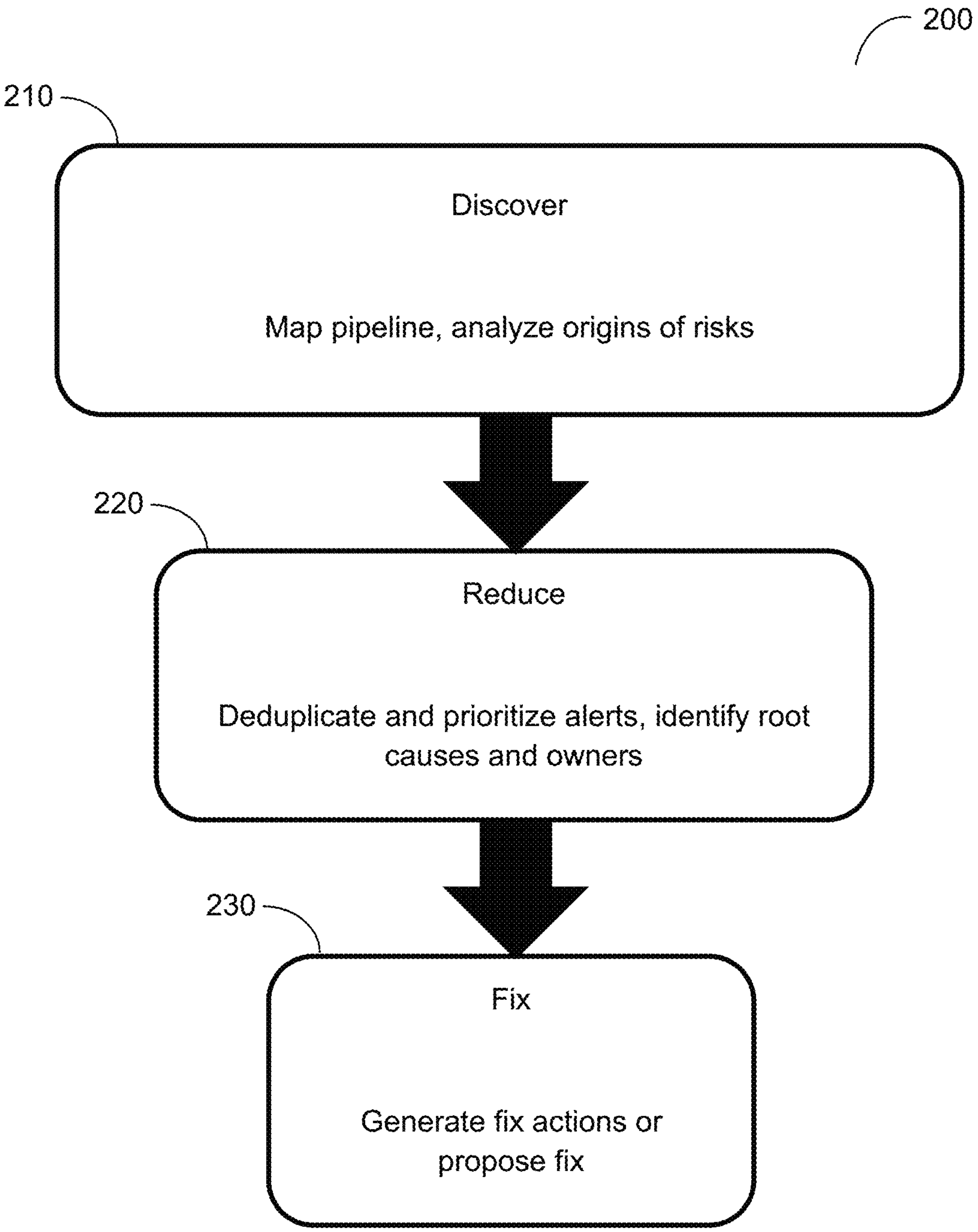
FIG. 2 is a flow diagram illustrating example phases for computing infrastructure security operations.

FIG. 2 is a flow diagram 200 illustrating example phases for computing infrastructure security operations. The flow diagram 200 illustrates a discovery phase 210, a reduction phase 220, and a fixing phase 230. Each of these phases is discussed in further detail below with respect to the following flowcharts.

As depicted in FIG. 2, the discovery phase 210 includes mapping a computing infrastructure pipeline and analyzing potential origins of risks. The result is a knowledge base which can be subsequently queried in order to derive information about potential root causes of alerts. Further, the discovery phase 210 may include identifying owners of code or other portions of the software infrastructure (i.e., engineers or computer scientists who wrote the code behind those portions) and mapping those owners in order to aid in attribution for purposes of, e.g., root cause analysis and fixing.

The reduction phase 220 includes reducing alerts via deduplication and prioritization, as well as identifying root causes and owners of root cause components. The result is a reduced set of data related to alerts, which may be enriched with data indicating the root causes, which can therefore be processed and utilized for implementing fixes more efficiently than the unreduced data.

The fixing phase 230 includes generating fix actions or otherwise proposing fixes. To this end, the fixing phase 230 further includes generating a fix action plan. The result of the fixing phase 230 may include, but is not limited to, a notification indicating the fix action plan, sets of computer-executable instructions for executing at least a portion of the fix action plan, both, and the like.

Figure 3:
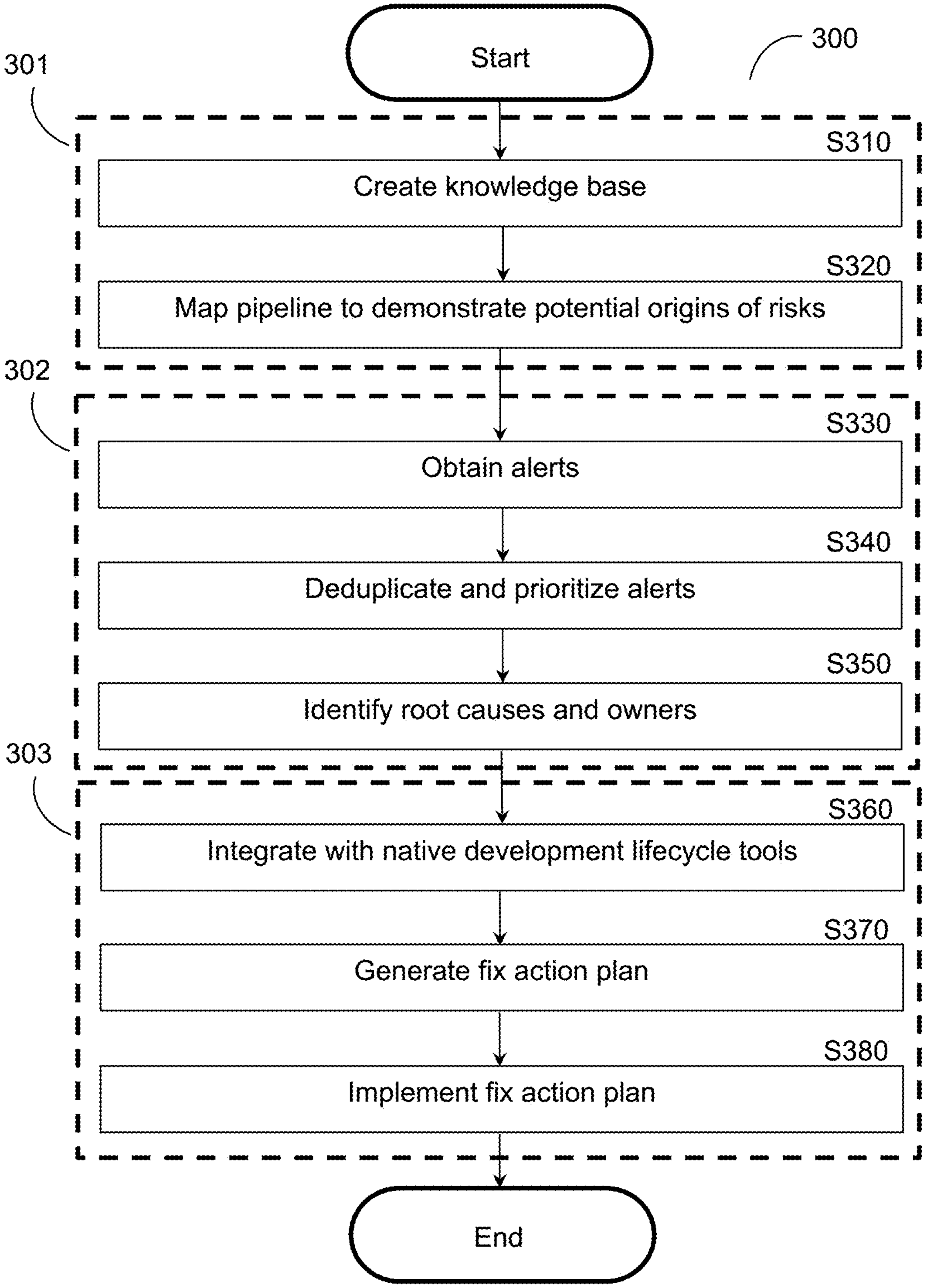
FIG. 3 is a flowchart illustrating a method for automated alert processing and fixing according to an embodiment.

FIG. 3 is a flowchart 300 illustrating a method for automated alert processing and fixing according to an embodiment. In an embodiment, the method is performed by the pipeline manager 100, FIG. 1.

During a discovery phase 301, resources are identified and mapped in a knowledge base. Specifically, at S310, a knowledge base is created. To this end, S310 may include, but is not limited to, deriving correlations between software components by analyzing SDLC pipeline data and log data, and creating an entity graph mapping such software components with respect to the derived correlations. Additionally, S310 may include creating or otherwise incorporating a semantic concepts dictionary defining potential characteristics of entities which may be represented in the entity graph into the knowledge base. An example method for creating a knowledge base is described further below with respect to FIG. 4.

At S320, the pipeline is mapped so as to demonstrate potential origins of risks. To this end, S320 may include, but is not limited to, enumerating steps of pipeline execution and mapping the enumerated steps with respect to components of the software development infrastructure, in particular, components represented as entities within the entity graph of the knowledge base. Moreover, the enumeration may be a recursive enumeration that begins at a top-level service identifier. The steps may further be classified to increase granularity of the mapping, thereby improving any cybersecurity decisions determined utilizing the mapping. An example method for mapping a pipeline is described further below with respect to FIG. 6.

In some embodiments, the mapping further includes nodes representing owners of code or portions of code. Specifically, such owners may be, but are not limited to, engineers, computer scientists, or other entities who wrote the code or portions thereof for software components among the software infrastructure. In other words, the owner of a piece of code is an entity who wrote the code and, consequently, may be an appropriate person to help fix any problems with the code if fully automated remediation is not being performed. Mapping code owners within the entity graph and, in particular, mapping code owners to their respective portions of code, allows for attributing root causes with respect to such portions of code to their owners, which in turn allows for automatically identifying appropriate code writers to notify of potential problems within the software infrastructure requiring fixing.

During a reduction phase 302, alerts are reduced via deduplication and prioritization as well as by identifying root causes and the entities which own the root causes. The result is a reduced set of information which can be processed more efficiently. To this end, at S330, alerts are obtained. The alerts may be received from one or more cybersecurity tools such as, but not limited to, scanners. Alternatively, the alerts may be retrieved from a repository storing alerts from such cybersecurity tools. The alerts at least indicate cybersecurity events related to components in the software infrastructure.

At S340, alerts are deduplicated and prioritized. Specifically, the entity graph is queried in order to determine correlations between components involved in the alerts across different portions of the software development pipeline. Alerts are matched based on the query results in order to identify duplicate alerts and then deduplicated by removing duplicate instances of alerts. The alerts may be prioritized using one or more prioritization rules that provide a ranking or scoring scheme for ranking alerts, and alerts with higher rankings are prioritized over alerts with lower rankings. More specifically, the ranking or scoring may be based on types of components involved in events, the data attached to the event, the locations of components involved in an event within the software infrastructure (e.g., within a particular portion of the software development pipeline), types of connections (e.g., based on classifications of steps), combinations thereof, and the like. An example method for reducing alerts including deduplication and prioritization is described further below with respect to FIG. 7.

At S350, root causes and owners are identified. In an embodiment, S350 includes traversing the entity graph beginning at components involved in alerts and continuing through identification of connected components (either connected directly by edges in the entity graph or indirectly through connections to other nodes). The traversal may be performed until one or more traversal end points are reached. Such end points may include, but are not limited to, terminal components (i.e., components represented by nodes which have no connections in the entity graph which have not already been traversed during this iteration), components located in certain portions of the software infrastructure, both, and the like.

During a fixing phase 303, a fix action plan is generated and sent for implementation, executed, or a combination thereof, thereby fixing the problems identified in the reduced set of alerts. To this end, the system conducting the fixing may integrate with native tools in the infrastructure and may execute part or all of the fix action plan via such integration. As a non-limiting example, a fix action plan may be generated and an external workflow may be generated by that system. The external workflow may involve using the native tools, and may only be resolved once appropriate activities are performed by the native tools. To this end, the native tools may be preconfigured with a fix workflow process such as, but not limited to, a change management approval process, in order to implement, build, and deploy the fix.

At S360, a system conducting the fixing is integrated with native development lifecycle tools. Such native development lifecycle tools may include third party infrastructure management tools such as, but not limited to, code repositories, ticketing or notification systems, CI/CD managers, identity providers, code scanners, IaC tools, container repositories, automated security tools, cloud provider infrastructures, vulnerability management tools, combinations thereof, and the like. The integration allows for creating a fix action plan which utilizes the appropriate tools as deployed in the infrastructure with respect to different root causes based on the deployment of those tools relative to the components which are determined to be root causes of alerts within a computing infrastructure. In other words, the fix action plan may be based on the location of each root cause entity within the entity graph, and any mitigation actions performed according to the fix action plan may utilize native development lifecycle tools configured to remediate issues in locations of the software infrastructure where root cause entities are located.

At S370, a fix action plan is generated. The fix action plan is defined with respect to components within the software infrastructure (i.e., components represented in the entity graph), and may be determined so as to indicate corrective actions for components which are determined as root causes. An example method for generating a fix action plan is described further below with respect to FIG. 8.

At S380, the fix action plan is implemented. Implementing the fix action plan may include, but is not limited to, sending a notification indicating the fix action plan, for example to an operator for manual implementation. Alternatively, implementing the fix action plan may include automatically acting upon the affected components in accordance with the generated fix action plan. To this end, in such an implementation, S380 may further include generating computer-executable instructions for performing the steps of the fix action plan. Further, in at least some embodiments, implementing the fix action plan may include a combination of sending a notification and automatically executing the fix action plan.

Figure 4:
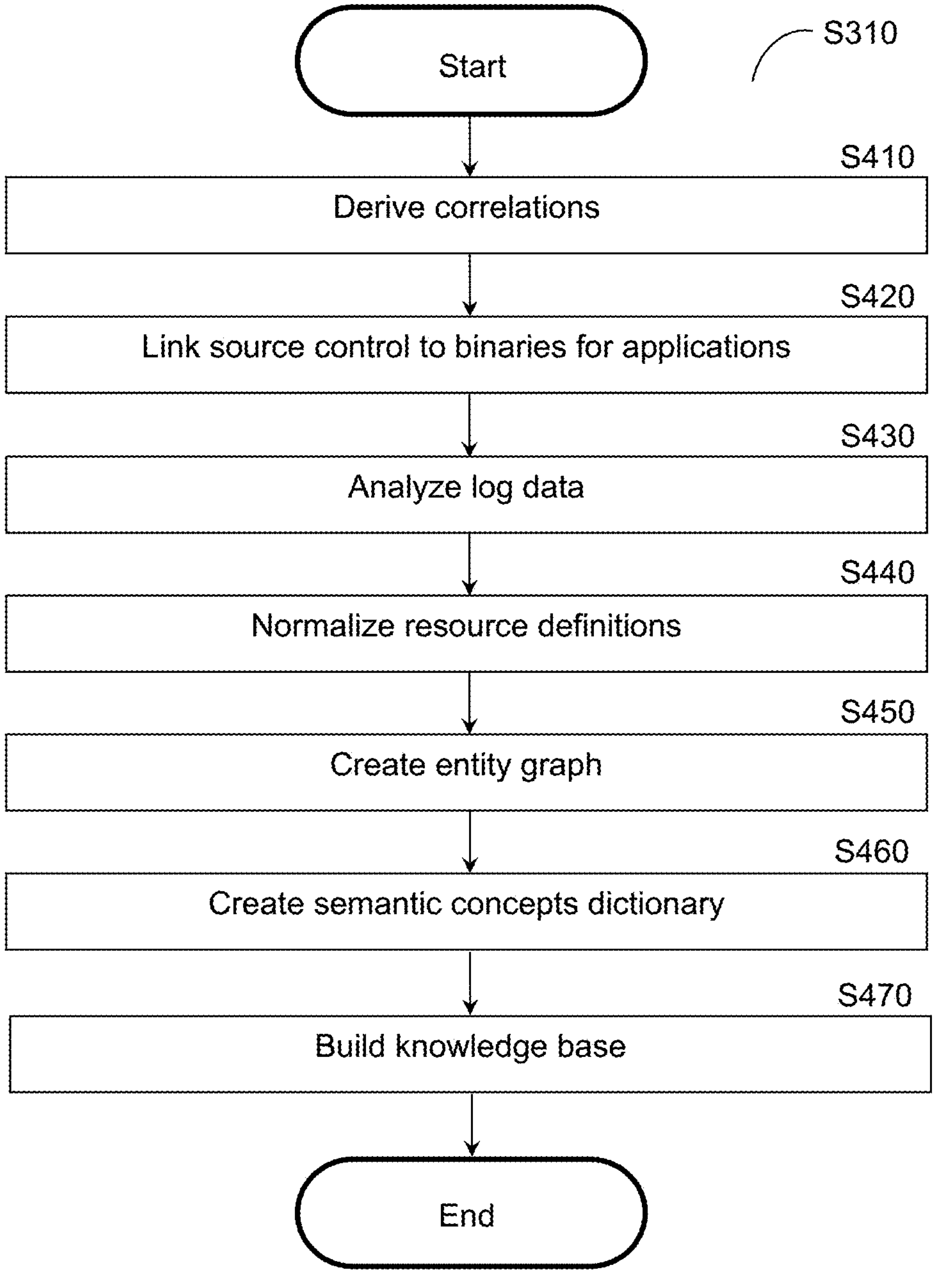
FIG. 4 is a flowchart illustrating a method for creating a knowledge base according to an embodiment.

FIG. 4 is a flowchart S310 illustrating a method for creating a knowledge base of semantic concepts and entity-identifying values according to an embodiment.

At S410, correlations between software components are derived by analyzing software development lifecycle (SDLC) pipeline data (e.g., data of a continuous integration [CI] and continuous delivery [CD] pipeline). Such SDLC data may include, but is not limited to, a pipeline configuration, build scripts, source code, combinations thereof, portions thereof, and the like. The correlations are identified based on references between software components indicated in such data, static analysis of software components, semantic analysis of text related to the software components, combinations thereof, and the like.

At S420, source control is linked to binaries of one or more applications based on the derived correlations. In an embodiment, S420 includes extracting uniquely identifying features of the source control artifact and binaries from the analyzed data. In a further embodiment, the linking is limited to pairs of binaries and source control artifacts selected from limited set of binaries and source control artifacts, respectively.

At S430, log data (e.g., log files) is analyzed for correlations. To this end, S430 may include identifying actions taken by software components and events which may be caused by those actions. These relationships may be identified based on circumstances such as, but not limited to, events occurring shortly after those actions, determinations that events which could logically have been caused by the actions, combinations thereof, and the like. The identification of S430 may be based on probabilistic analysis such that, for example, correlations having likelihoods above a threshold are identified.

As a non-limiting example, by analyzing log files from an integration or deployment server, links between code commits and binary hashes (and, consequently, the corresponding entities involved) may be identified. As another non-limiting example, by analyzing of files in a cloud environment, information identifying entities used by automation engines may be identified.

In this regard, it has been identified that correlations indicated between log files can demonstrate that particular deployments occurred previously, which in turn aids in providing visibility to the DevOps pipeline in situations where static analysis might not satisfy the constraints, and may further aid in finding hidden automation. This, in turn, provides additional information about relationships between software components and entity logic components which can be utilized in some non-limiting examples to more accurately identify root causes as discussed below with respect to FIG. 8.

It should be noted that S420 and S430 are both depicted as part of the flowchart 400, but that various embodiments may include either S420 or S430 without departing from the scope of the disclosure. As a non-limiting example, source control may be linked to binaries at S420 for implementations involving software containers, but such an implementation may not involve analyzing log files for correlations. Which steps are utilized for a given implementation may depend, for example, on the types of components deployed in the infrastructure or otherwise based on the types of components being evaluated.

At S440, resource definitions are normalized. In an embodiment, S440 includes identifying properties in an original definition of each software infrastructure resource, semantically analyzing the identified properties, and mapping the properties based on the results of the semantic analysis. The outcome is a set of properties in a universal definition format. An example method for transforming cloud resource definitions which may be utilized to normalize such definitions is described further below with respect to FIG. 5.

At S450, an entity graph is created based on the correlations identified at any or all of S410 through S430 using the normalized resource definitions. The entity graph includes nodes and edges. The nodes represent distinct logical entities such as, but not limited to, software components, event logic components, and the like. The edges connect entities based on the correlations identified at S410 through S430. The edges therefore represent relationships between pairs of entities, which in turn form paths as one navigates from a first entity to a second, from the second to a third, and so on. The paths following edges between nodes may therefore be utilized to identify connections between different entities (e.g., between event logic components and software components), thereby allowing for automatically and objectively identifying root causes of cybersecurity events.

In some embodiments, S450 further includes incorporating translated entity-defining datasets into the entity graph. To this end, in such embodiments, S450 includes embedding translated data into the entity graph, and S450 may further include performing such translation. The entity-defining datasets provide explicit definitions of features of potential entities to be included in the entity graph. As a non-limiting example, such a dataset may be a schema of a DevOps tool (e.g., Terraform) that defines the function performed by each portion of the tool. Further incorporating such explicitly defined features allows for further increasing the granularity of the graph, thereby further improving applications of said graph in identifying connections between cybersecurity event data and event logic components.

At S460, a semantic concepts dictionary is created. The semantic concepts dictionary may be populated with predetermined semantic concepts. The semantic concepts indicate potential characteristics of entities in the entity graph such as, but not limited to, type (e.g., "Docker container"), potential identifiers (e.g., an Internet Protocol address), build automation, configuration, portions thereof, combinations thereof, and the like. Such semantic concepts provide additional information regarding entities which may be used to improve the accuracy of root cause identification by providing additional identifying data for entities that can be queried. These semantic concepts indicating potential characteristics of entities may be included as nodes in the entity graph, or may be included in data of nodes of the entity graph.

At S470, a knowledge base is built. The knowledge base includes the entity graph and the semantic concepts dictionary.

Once built, the knowledge base can be queried as described herein (for example, as discussed with respect to FIGS. 3 and 8) in order to determine connections between software components and cybersecurity events or potential cybersecurity events, thereby providing context related to cybersecurity events and allowing for automatically suggesting remedial actions to address cybersecurity events based on such contexts.

It should be noted that the steps of FIG. 4 are depicted in a particular order, but that the steps are not necessarily limited to the order depicted. As a non-limiting example, the semantic concepts dictionary may be created before or in parallel with any of the steps S410 through S450 without departing from the scope of the disclosure.

Figure 5:
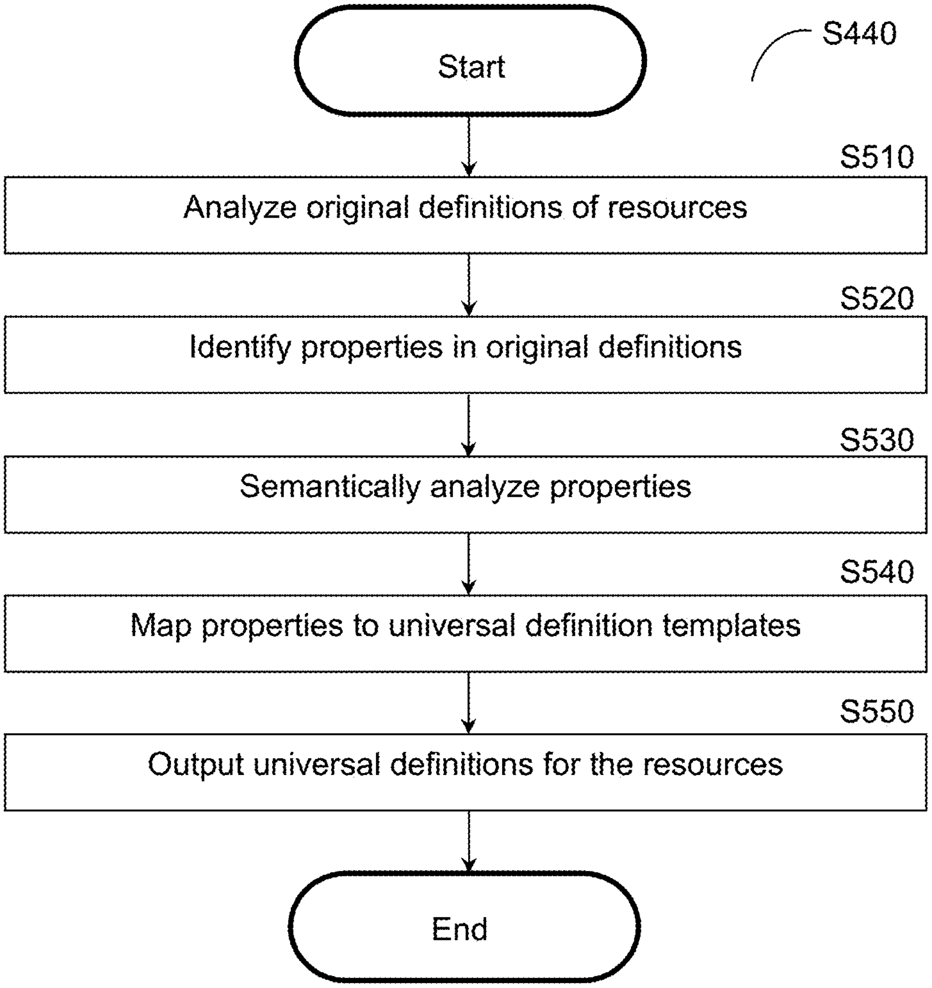
FIG. 5 is a flowchart illustrating a method for normalizing resource definitions according to an embodiment.

FIG. 5 is a flowchart S440 illustrating a method for transforming definitions of cloud resources according to an embodiment.

At S510, original definitions of computing infrastructure resources are analyzed. In an embodiment, S510 includes applying a policy engine to each original definition. Each original definition is expressed in an original IaC language.

In an embodiment, each original definition may be expressed in a declarative IaC language or in an imperative IaC language. A declarative IaC language is used to define resources in terms of the resulting resources to be deployed, while an imperative IaC language is used to define resources in terms of the commands to be utilized to deploy the resources which will result in the desired resources. The analysis performed at S510 may depend on the type of language (i.e., declarative or imperative) in which each original definition is expressed. More specifically, when the original definition for a resource is expressed in an imperative IaC language, S510 may further include performing control flow analysis on the imperative IaC language original definition in order to determine which resources are to be deployed.

In another embodiment, when the original definition is expressed in an imperative IaC language, S510 may further include instrumenting an IaC processor or IaC script corresponding to the original definition and analyzing the results of the execution. Instrumenting the IaC processor or IaC script (also referred to instrumenting IaC instructions of the IaC processor or IaC script) includes, but is not limited to, executing instructions of the IaC processor or IaC script and monitoring the execution for potential errors or abnormalities. The instrumented instructions may be executed in a controlled environment, e.g., an environment where the interactions with external systems and code (i.e., external to the controlled environment) is impossible, limited, or otherwise restricted to minimize harm that may come from executing untrusted code. In a further embodiment, instrumenting the IaC processor or script may also include replacing a backend of such processor or script with mock code and analyzing the output.

At S520, properties in the original definitions are identified. The properties include, but are not limited to, cybersecurity-related properties, at least some of which may be used to collectively uniquely identify a type of computing infrastructure resource. To this end, the properties may include, but are not limited to, configuration properties, encryption properties, backup properties, properties indicating connections to external systems, combinations thereof, and the like. The properties may further include other data describing or identifying computing resources such as, but not limited to, tags.

The properties may further include properties which are not necessarily used to determine a type of computing infrastructure resource but, instead, relate to a configuration which may differ even between the same types of computing infrastructure resource. As a non-limiting example, such a property for a virtual machine (VM) may be a property indicating whether the VM has Internet access, which some VMs may have and others may have not.

The properties may be identified using a policy engine configured according to an open policy engine language. As a non-limiting example, a policy engine defined via the open source language Rego may be utilized to identify the properties. Specifically, the properties may be identified as configuration properties, effects on a computing environment when the resource is deployed in the computing environment (e.g., resources created by the computing infrastructure resource, modifications to the computing environment made by the resource, etc.), both, and the like. These configurations and effects can be encoded into a single, unified format, in order to create the universal definitions of computing infrastructure resources.

Further, as noted above, for original definitions expressed in an imperative IaC language that are analyzed using control flow analysis, identifying the properties of the corresponding computing infrastructure resource may further include analyzing the commands indicated in the original definition in order to identify properties of the computing infrastructure resources deployed as a result of those commands.

Alternatively, identifying the properties for an imperative IaC language original definition may include instrumenting instructions of a corresponding IaC processor or script for the original definition and analyzing the results of such execution (e.g., the outputs and instrumentation logs resulting from instrumenting the instructions).

At S530, the identified properties are semantically analyzed. In an embodiment, S530 includes comparing the identified properties to predefined semantic concepts of known potential properties for computing infrastructure resources. More specifically, the known potential properties may be properties indicated or otherwise represented in universal definition templates. The semantic concepts may be semantic concepts included in a semantic concepts dictionary and stored in, for example, a state database such as the state database 145, FIG. 1.

At S540, the properties are mapped to universal definition templates based on the semantic analysis. That is, each property identified in one of the original definitions is mapped to a respective property represented in one or more of the universal definition templates. Accordingly, the mapping can be used to determine a matching universal definition template for a computing infrastructure resource based on a combination of the identified properties mapped to the properties of that universal definition template. In an embodiment, when the semantic analysis yields an identification of a type of the computing resource, a universal definition template associated with the identified type of the computing resource may be used to map the properties to the respective universal definition template.

At S550, a universal definition is output for each of the computing infrastructure resources based on the mapping. In an embodiment, S550 includes inserting one or more properties represented in the original definition of each computing infrastructure resource into respective fields of the matching universal definition template determined for the computing infrastructure resource at S540. The result of S550 is a universal definition for each of the computing infrastructure resources expressed in a unified format, which allows for application of policies created using the unified format.

Figure 6:
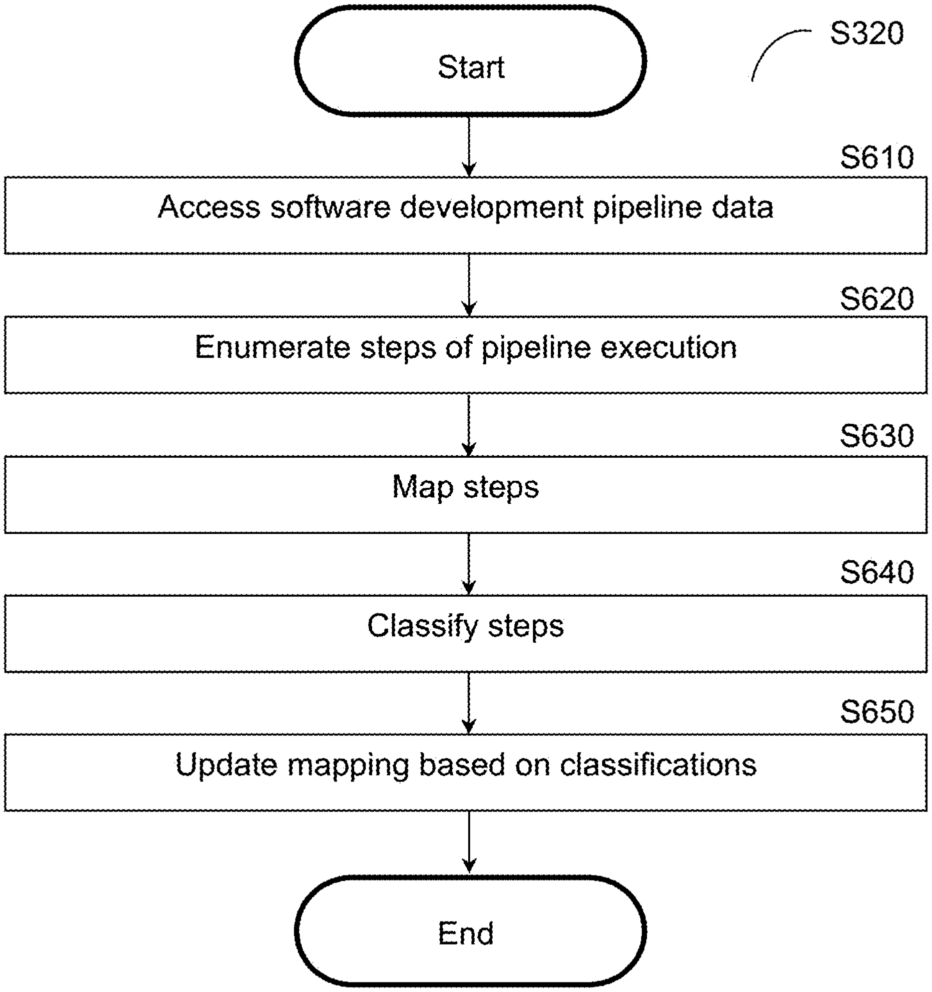
FIG. 6 is a flowchart illustrating a method for mapping a computing infrastructure pipeline according to an embodiment.

As a non-limiting example, for a Cryptographic Key computing infrastructure resource universal definition, an example universal definition may include the following properties represented in a unified format:

1. Allowed actions=encrypt, sign
2. Key rotation configuration=rotated every 24 hours
3. Symmetric?=true FIG. 6 is a flowchart S320 illustrating a method for updating a mapping of a software development pipeline according to an embodiment.

At S610, software development pipeline data is accessed or otherwise obtained. The software development pipeline data may be, for example, software development lifecycle (SDLC) pipeline data (e.g., data of a continuous integration [CI] and continuous delivery [CD] pipeline). Such SDLC data may include, but is not limited to, a pipeline configuration, a pipeline definition, build scripts and other scripts used in the pipeline (e.g., deployment scripts, validation scripts, testing scripts, etc.), source code, logs, manifests, metadata, combinations thereof, portions thereof, and the like. In some embodiments, the software development pipeline data may be accessed using computing interface permissions provided by an operator of the software development pipeline. The accessed software development pipeline may be, but is not limited to, data stored in a source control, data retrieved via an API, data uploaded by a user for analysis, combinations thereof, and the like.

At S620, steps of pipeline execution for one or more software development pipelines are enumerated. Each step is a procedure including a set of instructions (e.g., machine-readable computer instructions) for performing one or more respective tasks. In this regard, it is noted that a given software development pipeline includes one or more software components in a computing environment which may be accessed via procedures. Thus, the steps are enumerated such that the procedures used to access different components of the software development infrastructure within the pipeline can be identified and analyzed.

In an embodiment, S620 includes analyzing the logs, manifests, and metadata of the software development pipeline data. In a further embodiment, S620 may include performing a recursive enumeration that starts with a top-level identifier for a service (e.g., an organization identifier of an organization that owns or operates the service to be built using the software development pipeline). The recursive enumeration includes identifying, using data accessed via computing interfaces, components within the service in layers, with data related to components in one layer being used to enumerate components in the next layers. In other words, portions of the software development infrastructure are iteratively enumerated in multiple iterations by enumerating components within each layer of the software development infrastructure at each iteration. During this recursive enumeration, pipelines may be identified and then steps within the pipeline may be enumerated.

In this regard, it is noted that a software development infrastructure typically includes various logical components that encapsulate different aspects of the software development infrastructure with varying granularities. In other words, some aspects include others in a layered manner. As a non-limiting example, a top-level software development service (top layer/layer 1) to be built may include projects and repositories (layer 2), where each project includes one or more pipelines (layer 3), each pipeline includes jobs (layer 4), and each job utilizes one or more steps (layer 5). The sub-components of each logical component are reflected in the logs, manifests, and metadata of the software development infrastructure (i.e., the software development pipeline data accessed at S610) such that these sub-components can be identified, thereby enumerating components in each layer and ultimately enumerating steps in one of the layers. Further, relationships between and among these components and sub-components can be unearthed through this recursive enumeration.

To this end, in a further embodiment, S620 includes recursively enumerating all of the projects and repositories under the top-level identifier of a software development service using computing interfaces of the pipeline (e.g., using the provided computer interface permissions). For each project enumerated this way, the computing interfaces are used to enumerate all of the pipelines of the project, then the jobs of each pipeline, and finally the steps taken in each job's run. The result is a complete enumeration of all steps used for pipeline execution of software development pipelines within the software development infrastructure.

In another embodiment, one or more of the steps may be identified imperatively by analyzing different types of objects in the software development infrastructure. This imperative analysis may be performed when the types of objects differ between layers, i.e., when different layers include different types of objects such that layers can be distinguished based on the types of objects included therein. Thus, in such an embodiment, objects in the software development infrastructure may be enumerated without recursively enumerating layers, and relationships between and among components can be determined with respect to layers based on the types of components.

Alternatively or in addition, steps may be identified based on triggers between pipelines. More specifically, connections between components of different pipelines may be identified based on execution of a first pipeline triggering a second pipeline's execution. When there is a software dependency between a component built by the first pipeline and a component built by the second pipeline, execution of the first pipeline results in execution of the second pipeline when the component of the first pipeline calls the component of the second pipeline. In such a case, recursive analysis of the first pipeline may proceed into analyzing the second pipeline, thereby completing the analysis of the entire process starting with the first pipeline and resulting in execution of the second pipeline.

At S630, the enumerated steps are mapped with respect to components of a software development infrastructure in order to create a mapping that includes the relative locations of steps within the software development pipeline. In various embodiments, the steps are mapped at least with respect to each other within the pipeline.

The relative location of a given step with respect to other components of the software development infrastructure is defined at least with respect to connections between and among components of the software development infrastructure, and may further be defined with respect to order of processing related to those connections.

The connections may include passing arguments, passing outputs, and the like, from one component to another (e.g., from one step to another), or otherwise based on the use of the results of one component by another component. As a non-limiting example, a connection may be defined as artifacts built by one step being scanned by another step or arguments used by one step being passed to another step.

The order may be based on the flow of data between the connected steps, e.g., data output or processed by a first step in a given order may be subsequently passed to or processed by a second step that is identified as being later in the order. As a non-limiting example, code created at one step may be analyzed by another step. As another non-limiting example, code scanned at one step may be deployed in another step.

In at least some embodiments, the steps are mapped with respect to an entity graph indicating entities and connections between entities in the software development or SDLC pipeline. In a further embodiment, the entity graph may be part of a knowledge base constructed, for example, as described above with respect to FIG. 4. Creating entity graphs and knowledge bases for software development pipelines are described further in U.S. patent application Ser. No. 17/507,180, assigned to the common assignee, the contents of which are hereby incorporated by reference. The knowledge graph may further include step data associated with each mapped step which may be indicative of various properties of the mapped steps, and can therefore be queried for this step data.

At S640, the enumerated steps are classified. The classification is based on step properties of each step such as, but not limited to, provider, type, name, arguments, combinations thereof, and the like. In some embodiments, S640 further includes normalizing the step data which may indicate such step properties. Further, S640 may also include parsing and interpreting text of arguments in order to semantically analyze the arguments used by those steps, thereby improving the classification as compared to solutions which categorize steps based solely on name and/or task descriptions.

At S650, a mapping is updated based on the classifications of the steps. The mapping may be, for example, a mapping of entities in an entity graph. The mapping is updated so as to include the classifications of the step, for example, as properties of the mapped steps.

Figure 7:
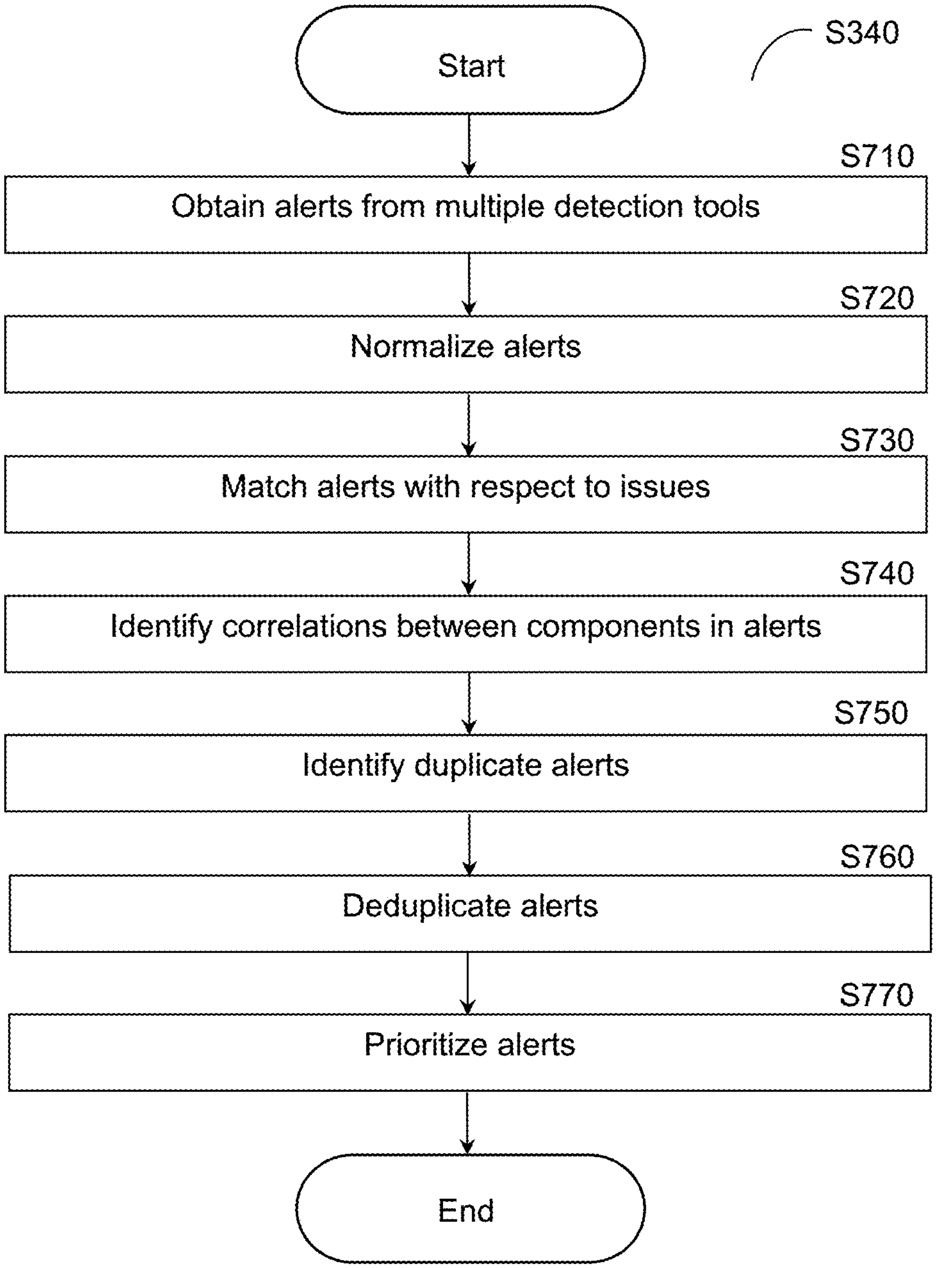
FIG. 7 is a flowchart illustrating a method for deduplicating and prioritizing alerts according to an embodiment.

FIG. 7 is an example flowchart S340 illustrating a method for alert management according to an embodiment.

At S710, alerts are obtained from detection tools. In accordance with various disclosed embodiments, the alerts are received from detection tools which monitor for events or other findings with respect to different parts of the software development pipeline (e.g., coding, building, deployment, staging, production). The alerts from different detection tools and/or related to different parts of the software development pipeline may be formatted differently and may indicate different software components which may be involved for any given cyber threat.

At S720, the obtained alerts are normalized. In an embodiment, the alerts are normalized into a unified notation. As noted above, alerts from different sources (e.g., different detection tools) may be formatted differently, even if those alerts contain similar information. Normalizing the alerts into a unified format allows for effectively comparing between differently formatted alerts. The alerts may be normalized, for example, with respect to universal definition templates as discussed above with respect to FIG. 5.

At S730, the alerts are analyzed in order to match the alerts with respect to issues indicated therein. In an embodiment, S730 includes analyzing the text of the alerts to identify related issue-indicating text or otherwise analyzing the alerts for predefined similar issues. Alternatively or in combination, any or all of the alerts may include data in a machine-readable format, and S730 may include analyzing certain fields or attributes of such machine-readable format data in order to identify similar fields or attributes.

In an embodiment, S730 includes analyzing common traits or indicators such as, but not limited to, common vulnerabilities and exposures (CVEs) indicated in alerts, in order to determine which common traits or indicators are included in each alert and comparing those common traits or indicators to determine which alerts relate to the same kind of issue. The common traits or indicators may be predetermined traits or indicators used by different detection tools such that they are represented in the same manner in alerts from those different detection tools.

In a further embodiment, one or more matching rules may be applied that define requirements for matching alerts based on such common traits or indicators. Such rules may require, for example, matching at least one common trait or indicator, matching a threshold number of common traits and/or indicators, matching particular sets of common traits and/or indicators, combinations thereof, and the like. In this regard, it is noted that CVEs included in alerts include standardized identifiers for particular vulnerabilities and exposures. These standardized identifiers will therefore demonstrate the type of issues involved in the alert in a format that is directly comparable to that of other alerts.

In yet a further embodiment, S730 may further include analyzing meta information about the common trait or indicator (e.g., a CVE) and relevant packages such as, but not limited to, version. This allows for further improving the granularity of the comparison and, therefore, the accuracy of the matching.

At S740, correlations among software components related to the alerts are identified. The correlations may include, but are not limited to, correlations between portions of source code with discrete software components (e.g., correlations between build files and particular software containers). As a non-limiting example, a correlation may be identified between a build file containing instructions for creating a given container image and the software container corresponding to that container image.

In an embodiment, S740 includes querying a data structure (e.g., a database) storing an inventory of associations between software components among different components of the software development pipeline. In accordance with various disclosed embodiments, such a data structure includes the entity graph as described herein. In a further embodiment, the correlations database is created using an attribution process, where the correlations in the database are based on the attributions. In yet a further embodiment, at least a portion of the attribution process is performed as described in U.S. patent application Ser. No. 17/656,914, assigned to the common assignee, the contents of which are hereby incorporated by reference.

More specifically, in an embodiment, the inventory at least includes associations between build files and configuration files, with each configuration file corresponding to a respective software container. Accordingly, querying a data structure including such an inventory using a given file allows for identifying correlations across different portions of the software development pipeline. By identifying correlations between components indicated by alerts in different portions of the software development pipeline as well as matching the alerts themselves, alerts which relate to the same underlying issue or threat may be identified as duplicates with a high degree of accuracy, thereby allowing for accurate deduplication and prioritization of alerts.

In an embodiment, S740 includes marking the alerts with the identified correlations. As a non-limiting example, when a correlation between a software container "SC1" and a build file "BF1" is identified with respect to SC1 and BF1 being indicated in alert messages from different detection tools, an alert indicating SC1 may be marked as also relating to BF1 and vice versa, i.e., an alert indicating BF1 may be marked as also related to SC1.

At S750, alerts from different detection tools are matched in order to identify one or more sets (i.e., groups) of duplicate alerts. Each set of matching alerts demonstrates relationships across different portions of the software development infrastructure realized as a combination of at least source verification and correlations. In other words, in an embodiment, two alerts are determined to be duplicates of each other when they both indicate correlated software components and relate to the same type of issue.

In this regard, it has been identified that matching alerts based on common traits or indicators such as CVEs alone does not allow for accurately identifying duplicate alerts since the same trait in two different alerts indicates that those alerts might relate to the same kind of issue, but not necessarily to the same specific issue or root cause. By both identifying the same kind of issue (e.g., based on CVEs) and identifying related software components (e.g., based on correlations between data such as build and configuration files for the same software container) indicated in two alerts, those alerts can be identified as duplicates with a high degree of accuracy. In other words, two alerts that relate to the same issue (i.e., including the same CVEs) in which software components indicated in one alert are linked to software components in the other alert can be said to be alerts for the same underlying issue (and therefore duplicates) with a high degree of accuracy.

At S760, the alerts are deduplicated based on the matching. Deduplicating the alerts may include, but is not limited to, grouping together matching alerts or removing redundant instances of matching alerts such that only one instance of each unique alert remains across alerts generated by different tools.

At S770, the alerts are prioritized. The prioritization may be performed using one or more prioritization rules, and more specifically prioritization rules that define how to prioritize alerts with respect to a mapping of the software infrastructure (e.g., the mapping in the entity graph described herein. The prioritization rules may define conditions including, but not limited to, specific components, types of components, relative locations within a software infrastructure, connections (e.g., connections to specific other components), combinations thereof, and the like, and may rank the aforementioned items. The ranking may be used to prioritize alerts. For example, a component who meets one or more conditions which are ranked higher than the conditions met by another component may be prioritized over that other component. Further, a weighted scoring scheme may be utilized for instances where a component might meet more than one condition, and the prioritization rules may further define the weighted scoring scheme including any applicable weights.

As a non-limiting example, alerts are obtained from at least two tools: a Lacework™ detection tool and a Snyk™ detection tool. In this example, the Lacework™ tool generates an alert for a container image hosted in a customer's software container registry. Accordingly, the Lacework™ tool generates alerts related to a build artifact of the software development pipeline. The Snyk™ tool generates an alert based on source code of the customer, i.e., the Snyk™ tool generates alerts related to a coding phase of the software development pipeline. In this example, both the Lacework™ tool and the Snyk™ tool generate an alert indicating the CVE with the identifier "CVE-2022-24434," which indicates that a software component being developed may be vulnerable to Denial of Service (DOS) attacks.

In this example, based on the common CVE, the alerts are further analyzed for components indicated therein, and the container image in the Lacework™ tool alert is identified. A database is queried with a configuration file of the container image, and the database returns a connection between the configuration file (and, consequently, the container image itself) and a Docker file (a type of build file) that is indicated in the Snyk™ tool alert. The alerts generated by the Lacework™ tool and the Snyk™ tool may each be marked with the correlation. Accordingly, the Lacework™ tool and the Snyk™ tool alerts are identified as duplicates of each other and managed accordingly. In particular, either the alerts are combined into a single alerts summary or otherwise one of the alerts is removed, thereby reducing the total numbers of alerts to be addressed.

Figure 8:
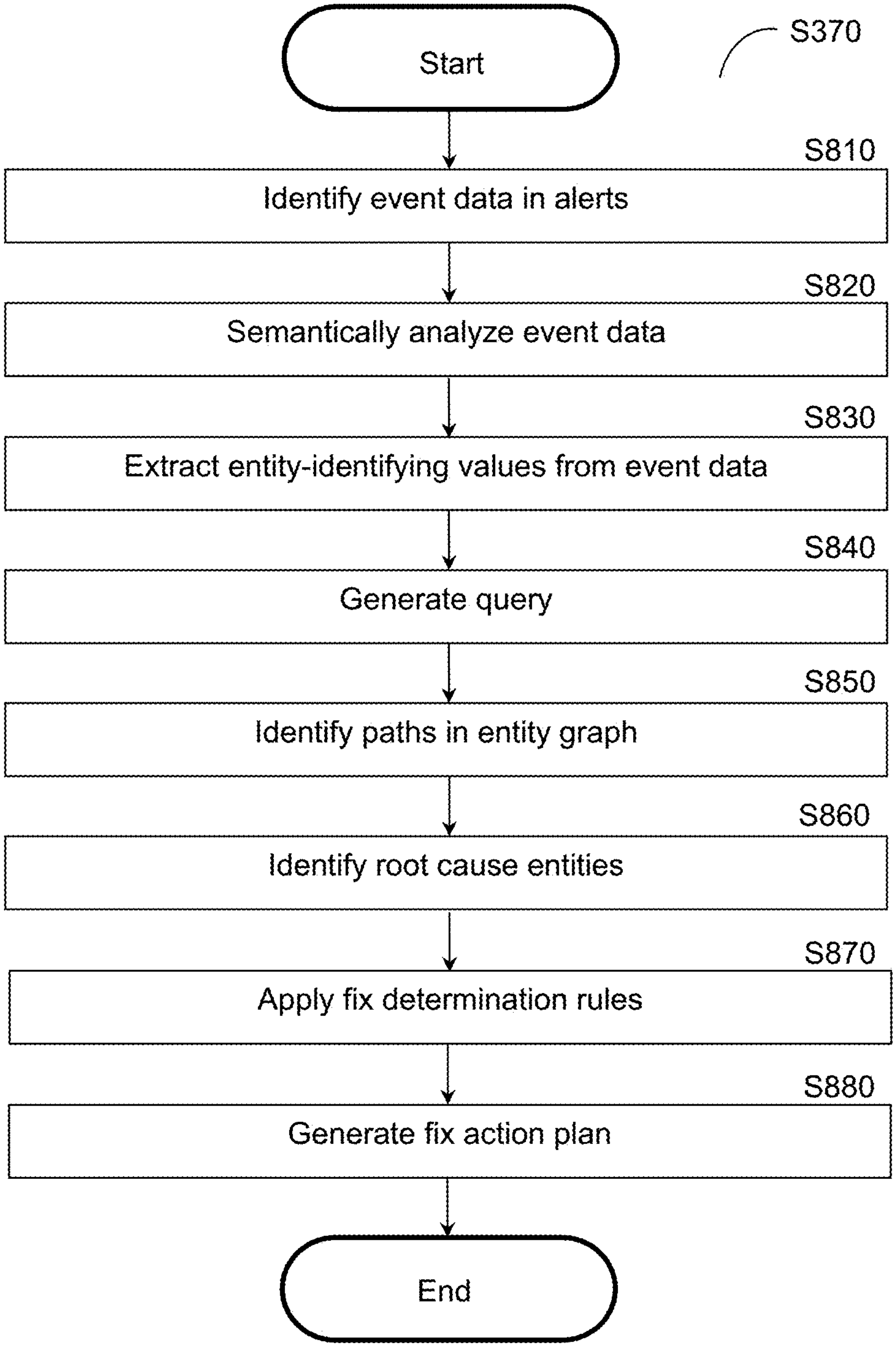
FIG. 8 is a flowchart illustrating a method for generating a fix action plan according to an embodiment.

FIG. 8 is a flowchart S370 illustrating a method for remediating cybersecurity events based on entity-identifying values and semantic concepts according to an embodiment. In an embodiment, the method is performed by the pipeline manager 100, FIG. 1.

At S810, cybersecurity event data is identified within alerts. Identifying the cybersecurity event data may include, but is not limited to, applying event identification rules which define procedures for parsing alerts in order to identify events contained therein. Such event identification rules may further include definitions of known event formatting, known organization of events within alerts, keywords known to be indicative of events, combinations thereof, and the like.

In some embodiments, the cybersecurity event may be a simulated cybersecurity event or otherwise the cybersecurity event data may be simulated cybersecurity event data such that the method may begin even if an actual cybersecurity event has not yet occurred (e.g., before an alert has triggered or otherwise before the cybersecurity event is indicated in cybersecurity event data). Such simulated data may be provided via user inputs, may be randomly generated, and the like. Using simulated cybersecurity events allows for proactively testing the software infrastructure, which in turn can be utilized to remediate problems before the software infrastructure actually experiences those problems.

At S820, the cybersecurity event data is semantically analyzed. In an embodiment, S820 includes extracting semantic keywords from textual content included in the cybersecurity event data. Such textual content may include, but is not limited to, text of an alert or log, text of a policy or other event logic component linked to a cybersecurity event (e.g., code defining detection logic used to detect the cybersecurity event, a query which resulted in the alert triggering, etc.), a machine readable representation of an alert (e.g., a JSON or XML representation of the alert), combinations thereof, and the like. To this end, in a further embodiment, S820 may further include performing natural language processing on such text in order to identify known semantic concepts (e.g., semantic concepts defined in a semantic concepts dictionary) and to extract the identified semantic concepts. Alternatively or collectively, S820 may further include mapping from tokens of a machine readable representation to semantic concepts, where the mapping may be explicitly defined or learned using machine learning.

At S830, entity-identifying values are extracted from the cybersecurity event data. In an embodiment, S830, includes applying one or more entity identification rules in order to identify the values to be extracted from the cybersecurity event data. Such rules may define, for example but not limited to, fields that typically contain entity-identifying values, common formats of entity-identifying values, other indicators of a value that represents a specific entity, and the like. The entity-identifying values may include, but are not limited to, values which identify a specific entity, values which indicate groups to which an entity belongs (e.g., a name of a resource group to which the entity belongs), both, and the like. Alternatively or collectively, a machine learning model trained to extract entity-identifying values may be applied to the cybersecurity event data.

At S840, a query is generated and applied based on the semantic analysis and the entity-identifying values. In an embodiment, the query includes both one or more semantic concepts as well as one or more entity-identifying values.

The query may be generated based on a predetermined query language. Such a query language may be designed for the purpose of harnessing logical deduction rules for querying entity graphs or relational databases in order to obtain relevant information for development, security, and operations for the various domains of a software infrastructure. Alternatively, the query may be generated in a general purpose query language. In some implementations, the query language may be custom-defined to allow for customization of queries for a specific environment (e.g., a cloud environment used by a specific company) in a manner that can scale up to different stacks.

In an embodiment, the query is applied using a fuzzy matching process based on a predetermined template. The fuzzy matching process yields results indicating an event logic component (e.g., a policy, code defining business logic, a query, a portion thereof, etc.) and a software component entity among the entity graph that most closely matches the event logic component and software component entities indicated in the text of the cybersecurity event data.

It should be noted that steps S820 through S840 are described in some embodiments as being potentially performed when an alert has already been received, but that the disclosed embodiments are not limited to such an implementation. In particular, an alert may be semantically analyzed prior to the alert actually being triggered, for example by using the alert as simulated cybersecurity event data. In this regard, it is noted that some forms of cybersecurity event data such as alerts may use predetermined text that is included in notifications when the alert is generated. Accordingly, such predetermined text can be semantically analyzed before the alert is actually received, and the results of the prior semantic analysis may be used as described herein.

At S850, one or more paths between a discrete portion of event logic related to the cybersecurity event and an entity in a software infrastructure are identified within an entity graph (e.g., the entity graph created as described above with respect to S450) based on the results of the query. As noted above, the generated query includes both semantic concepts and entity-identifying values extracted from the cybersecurity event data, which indicates both entities involved in the event that resulted in the cybersecurity event data being generated or provided and the event logic related to the cybersecurity event (e.g., event logic of a policy which triggered an alert for the cybersecurity event, business logic which was used to generate log data indicating the cybersecurity event, queries about the cause of a cybersecurity event, etc.). Using these concepts and values to query the entity graph allows for identifying paths between specific entities of the software infrastructure and event logic related to the cybersecurity event.

In some implementations, multiple paths are identified between the event logic component and the software component, and one or more root cause paths are determined as the paths to use for subsequent processing. Each root cause path may be, for example but not limited to, a shortest path among paths (e.g., one of the paths having the fewest links connecting nodes from a node representing a policy indicated by an alert to a node representing the entity indicated in the cybersecurity event data).

At S860, one or more root cause entities are identified based on the paths. The root cause entities may be entities associated with event logic related to the cause of a cybersecurity event indicated in the cybersecurity event data such as, but not limited to, each software component of the software infrastructure that is connected to a policy which triggered an alert via the identified at least one path. The root cause entities are collectively determined as the root cause of the cybersecurity event. As a non-limiting example, a root cause entity may be an entity containing faulty code (e.g., a file or container) which caused an alert to trigger. By identifying the entities which are the root cause of a cybersecurity event, more accurate and specific information about the cause of the cybersecurity event can be provided, and appropriate remedial actions involving those entities may be determined.

At S870, fix determination rules are applied with respect to the identified root causes. The fix determination rules may be, but are not limited to, predetermined rules defining known fixes for respective root causes. The fix determination rules may further be defined with respect to locations within the software infrastructure which may be indicated in entity graphs as described herein. That is, the fix determination rules may define fixes which are known to correct certain types of root causes generally, may specifically define fixes for certain types of root causes when they occur in a particular location relative to the rest of the computing infrastructure, or both. To this end, S870 may further include identifying locations of the root cause entities within the software infrastructure based on the mapping.

At S880 a fix action plan is generated based on the results of applying the fix determination rules. The fix action plan includes one or more remedial actions, and may provide indications of entities as demonstrated in the entity graph or otherwise indicate components within the software infrastructure to which the fix action plan should be applied, owners of those components who should apply part of all of the fix action plan, or other information represented in the entity graph relevant to implementing the fix action plan. The fix action plan may be realized as human-readable data (e.g., text), as computer-readable instructions (i.e., code), and the like. When the fix action is to be implemented automatically, the fix action plan may further include instructions for performing the remedial actions.

The remedial actions may include, but are not limited to, generating and sending a notification, performing mitigation actions such as changing configurations of software components, changing code of software components, combinations thereof, and the like. As a non-limiting example, a configuration of a root cause entity that is a software component may be changed from "allow" to "deny" with respect to a particular capability of the software component, thereby mitigating the cause of the cybersecurity event.

When the remedial action includes generating a notification, S880 may further include determining to which person the notification should be sent. In implementations where the entity graph includes nodes representing code owners, the entity to which the notification should be sent may be a person, team, business unit, and the like, represented by a code owner node linked to the root cause entity node in the entity graph. As noted above, by using known links between software components and code owners, an appropriate person to investigate or fix an issue can be automatically and accurately identified.

Additionally, when the remedial action includes generating a notification, the notification may further indicate a degree of risk of the underlying issue. Such a degree of risk may be determined based on, for example, the semantic analysis of the cybersecurity event data, text of the cybersecurity event data, a known risk level associated with event logic components related to the cybersecurity event indicated in the cybersecurity event data, a predetermined degree of importance of the root cause entities, a number of edges connecting the root cause entities to other software components of the entity graph, a number of edges connecting an entity in the path to a known security risk, a combination thereof, and the like. Such a degree of risk may serve to demonstrate the urgency needed for responding to the issue to a user being notified of the issue, which may help in determining how to prioritize fixing the issue.

Figure 9:
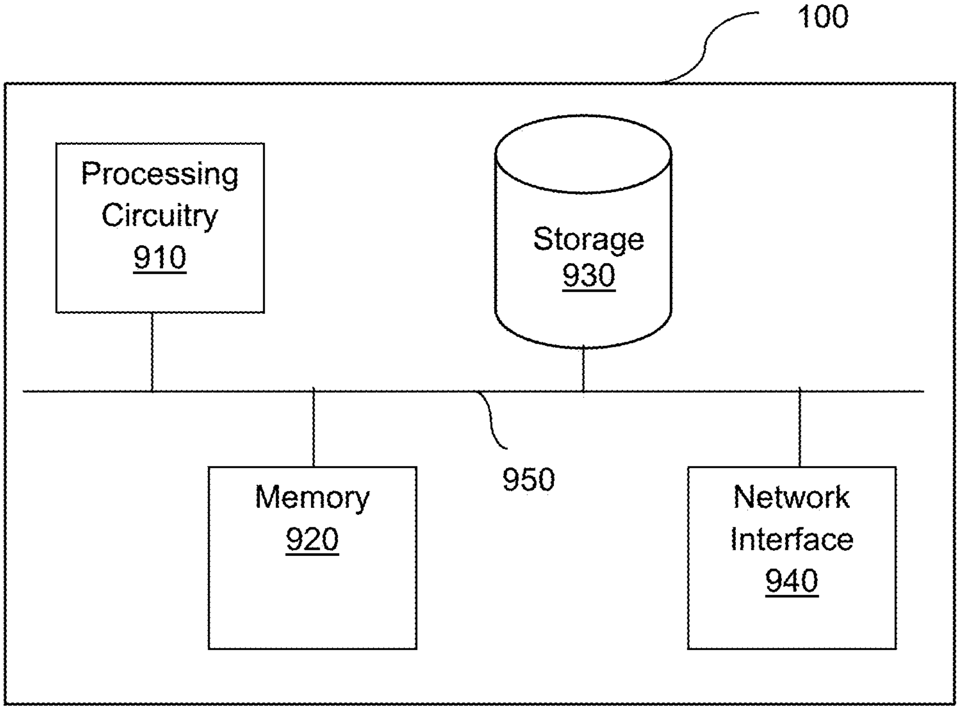
FIG. 9 is a schematic diagram of a hardware layer of a pipeline manager according to an embodiment.

FIG. 9 is an example schematic diagram of a hardware layer of the pipeline manager 100 according to an embodiment. The system 130 includes a processing circuitry 910 coupled to a memory 920, a storage 930, and a network interface 940. In an embodiment, the components of the pipeline manager 100 may be communicatively connected via a bus 950.

The processing circuitry 910 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 920 may be volatile (e.g., random access memory, etc.), non-volatile (e.g., read only memory, flash memory, etc.), or a combination thereof.

In one configuration, software for implementing one or more embodiments disclosed herein may be stored in the storage 930. In another configuration, the memory 920 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 910, cause the processing circuitry 910 to perform the various processes described herein.

The storage 930 may be magnetic storage, optical storage, and the like, and may be realized, for example, as flash memory or other memory technology, compact disk-read only memory (CD-ROM), Digital Versatile Disks (DVDs), or any other medium which can be used to store the desired information.

The network interface 940 allows the pipeline manager 100 to communicate with, for example but not limited to, tenant resources (e.g., resources storing data related to computing infrastructure pipelines), third party infrastructure management tools (e.g., code repositories, ticketing or notification systems, CI/CD managers, identity providers, code scanners, IaC tools, container repositories, automated security tools, cloud provider infrastructures, vulnerability management tools, etc.), both, and the like.

It should be understood that the embodiments described herein are not limited to the specific architecture illustrated in FIG. 9, and other architectures may be equally used without departing from the scope of the disclosed embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various embodiments disclosed herein can be implemented as hardware, firmware, software, or any combination thereof. Moreover, the software may be implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for alert fixing, comprising:

creating an entity graph based on a plurality of correlations among a first plurality of software components of a software development infrastructure, wherein the entity graph includes a plurality of nodes, wherein a plurality of first nodes among the plurality of nodes of the entity graph represent software components among the first plurality of software components;

extracting a plurality of entity-identifying values from a plurality of alerts;

querying the entity graph based on the plurality of entity-identifying values to obtain query results;

identifying a top-level identifier for a service associated with the plurality of alerts based on the query results;

enumerating a plurality of pipeline execution steps beginning from the top-level identifier, wherein the enumeration includes analyzing logs, manifests, and metadata of software development pipeline data with respect to the first plurality of software components of the software development infrastructure;

mapping a software development pipeline in the entity graph based on the enumerated plurality of pipeline execution steps;

determining a plurality of correlations between software components among a second plurality of software components indicated in the plurality of alerts based on the query results;

deduplicating the plurality of alerts by matching between alerts among the plurality of alerts based on the plurality of correlations in order to create a set of deduplicated alerts;

generating at least one fix action based on the set of deduplicated alerts; and securing the software development infrastructure by causing implementation of the at least one fix action.

2. The method of claim 1, further comprising:

creating a semantic concepts dictionary, wherein the semantic concepts dictionary defines a plurality of semantic concepts describing characteristics of the first plurality of software components, wherein the plurality of correlations is determined based further on the semantic concepts dictionary.

3. The method of claim 1, wherein the plurality of nodes of the entity graph further includes a second plurality of nodes, wherein the second plurality of nodes represent a plurality of event logic components of cybersecurity event logic deployed with respect to the software development infrastructure, wherein the cybersecurity event logic is a condition and the plurality of alerts are generated based on satisfaction of the condition and determining the plurality of correlations between the software components among the second plurality of software components further comprises:

identifying at least one path between the second plurality of software components and the plurality of event logic components based on the query results and a path-selection criterion, wherein the at least one fix action is generated based further on the identified at least one path.

4. The method of claim 3, further comprising:

identifying at least one root cause of the plurality of alerts based on the identified at least one path; and enriching the set of deduplicated alerts based on the at least one root cause, wherein the at least one fix action is generated based on the enriched set of deduplicated alerts.

5. The method of claim 3, wherein the entity graph further includes a third plurality of nodes representing a plurality of code owners of the plurality of software components, further comprising:

identifying a code owner among the plurality of code owners, via the entity graph, based on the identified at least one path and the plurality of correlations;

generating at least one notification based on the at least one fix action; and sending the generated at least one notification to the code owner.

6. The method of claim 1, further comprising:

prioritizing the set of deduplicated alerts based on the entity graph; and determining an alert prioritization based on the set of deduplicated alerts wherein the at least one fix action is prioritized based on the alert prioritization.

7. The method of claim 1, further comprising:

identifying a first plurality of properties in a plurality of original definitions of a plurality of computing infrastructure resources based on a policy, wherein each original definition is a definition of a respective software component of the plurality of software components;

mapping the first plurality of properties to a second plurality of properties of a plurality of universal definition templates in order to determine a matching universal definition template for each original definition, wherein each of the plurality of universal definition templates corresponds to a respective type of computing infrastructure resource and is defined in a unified format; and transforming the plurality of original definitions into a plurality of universal definitions using the plurality of universal definition templates.

8. The method of claim 3, further comprising:

selecting the at least one path that connects a first node in the entity graph representing a policy indicated by an alert among the plurality of alerts to a second node in the entity graph representing an entity indicated in the alert.

9. The method of claim 1, further comprising:
identifying a list of all steps executed in one or more pipeline runs within a defined time window based on the enumerated plurality of pipeline execution steps; and
classifying each step in the list of all steps, wherein the mapped entity graph is further based on the classification of each step in the list of all steps.

10. The method of claim 1, further comprising:
simulating a cybersecurity alert; and
including the simulated cybersecurity alert in the plurality of alerts.

11. A non-transitory computer readable medium having stored thereon instructions for causing a processing circuitry to execute a process, the process comprising:
creating an entity graph based on a plurality of correlations among a first plurality of software components of a software development infrastructure, wherein the entity graph includes a plurality of nodes, wherein a plurality of first nodes among the plurality of nodes of the entity graph represent software components among the first plurality of software components;
extracting a plurality of entity-identifying values from a plurality of alerts;
querying the entity graph based on the plurality of entity-identifying values to obtain query results;
identifying a top-level identifier for a service associated with the plurality of alerts based on the query results;
enumerating a plurality of pipeline execution steps beginning from the top-level identifier, wherein the enumeration includes analyzing logs, manifests, and metadata of software development pipeline data with respect to the first plurality of software components of the software development infrastructure;
mapping a software development pipeline in the entity graph based on the enumerated plurality of pipeline execution steps;
determining a plurality of correlations between software components among a second plurality of software components indicated in the plurality of alerts based on the query results;
deduplicating the plurality of alerts by matching between alerts among the plurality of alerts based on the plurality of correlations in order to create a set of deduplicated alerts;
generating at least one fix action based on the set of deduplicated alerts; and
securing the software development infrastructure by causing implementation of the at least one fix action.

12. A system for alert fixing, comprising:
a processing circuitry; and
a memory, the memory containing instructions that, when executed by the processing circuitry, configure the system to:
create an entity graph based on a plurality of correlations among a first plurality of software components of a software development infrastructure, wherein the entity graph includes a plurality of nodes, wherein a plurality of first nodes among the plurality of nodes of the entity graph represent software components among the first plurality of software components;
extract a plurality of entity-identifying values from a plurality of alerts;
query the entity graph based on the plurality of entity-identifying values to obtain query results;
identify a top-level identifier for a service associated with the plurality of alerts based on the query results;
enumerate a plurality of pipeline execution steps beginning from the top-level identifier, wherein the enumeration includes analyzing logs, manifests, and metadata of software development pipeline data with respect to the first plurality of software components of the software development infrastructure;
map a software development pipeline in the entity graph based on the enumerated plurality of pipeline execution steps;
determine a plurality of correlations between software components among a second plurality of software components indicated in the plurality of alerts based on the query results;
deduplicate the plurality of alerts by matching between alerts among the plurality of alerts based on the plurality of correlations in order to create a set of deduplicated alerts;
generate at least one fix action based on the set of deduplicated alerts; and
secure the software development infrastructure by causing implementation of the at least one fix action.

13. The system of claim 12, wherein the system is further configured to:
create a semantic concepts dictionary, wherein the semantic concepts dictionary defines a plurality of semantic concepts describing characteristics of the first plurality of software components, wherein the plurality of correlations is determined based further on the semantic concepts dictionary.

14. The system of claim 12, wherein the plurality of nodes of the entity graph further includes a second plurality of nodes, wherein the second plurality of nodes represent a plurality of event logic components of cybersecurity event logic deployed with respect to the software development infrastructure, wherein the cybersecurity event logic is a condition and the plurality of alerts are generated based on satisfaction of the condition and the system is further configured to:
identify at least one path between the second plurality of software components and the plurality of event logic components based on the query results and a path-selection criterion, wherein the at least one fix action is generated based further on the identified at least one path.

15. The system of claim 14, wherein the system is further configured to:
identify at least one root cause of the plurality of alerts based on the identified at least one path; and
enrich the set of deduplicated alerts based on the at least one root cause, wherein the at least one fix action is generated based on the enriched set of deduplicated alerts.

16. The system of claim 14, wherein the entity graph further includes a third plurality of nodes representing a plurality of code owners of the plurality of software components, further comprising:
identify a code owner among the plurality of code owners, via the entity graph, based on the identified at least one path and the plurality of correlations;
generate at least one notification based on the at least one fix action; and
send the generated at least one notification to the code owner.

17. The system of claim 12, wherein the system is further configured to:
prioritize the set of deduplicated alerts based on the entity graph; and determine an alert prioritization based on the set of deduplicated alerts wherein the at least one fix action is prioritized based on the alert prioritization.

18. The system of claim 12, wherein the system is further configured to:

identify a first plurality of properties in a plurality of original definitions of a plurality of computing infrastructure resources based on a policy, wherein each original definition is a definition of a respective software component of the plurality of software components;

map the first plurality of properties to a second plurality of properties of a plurality of universal definition templates in order to determine a matching universal definition template for each original definition, wherein each of the plurality of universal definition templates corresponds to a respective type of computing infrastructure resource and is defined in a unified format; and transform the plurality of original definitions into a plurality of universal definitions using the plurality of universal definition templates.

* * * * *